March 5, 1968 O. A. YOST 3,371,644
PROPELLER DRIVE SHAFT AND BEARING ASSEMBLY
Filed Oct. 13, 1966 5 Sheets-Sheet 1
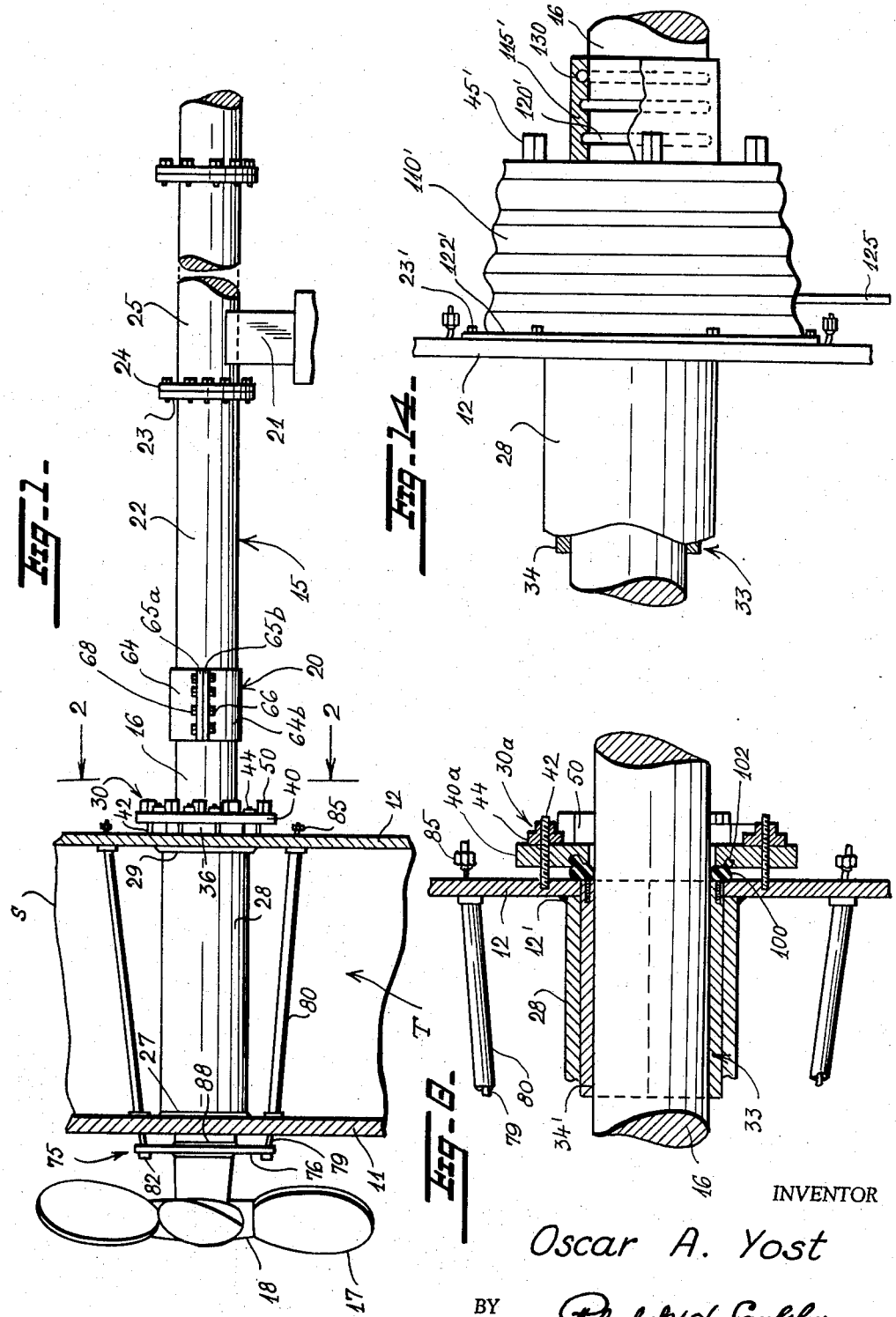
INVENTOR
Oscar A. Yost
BY Polachek & Saulsbury
ATTORNEYS March 5, 1968
O. A. YOST
3,371,644
PROPELLER DRIVE SHAFT AND BEARING ASSEMBLY
Filed Oct. 13, 1966
5 Sheets-Sheet 2
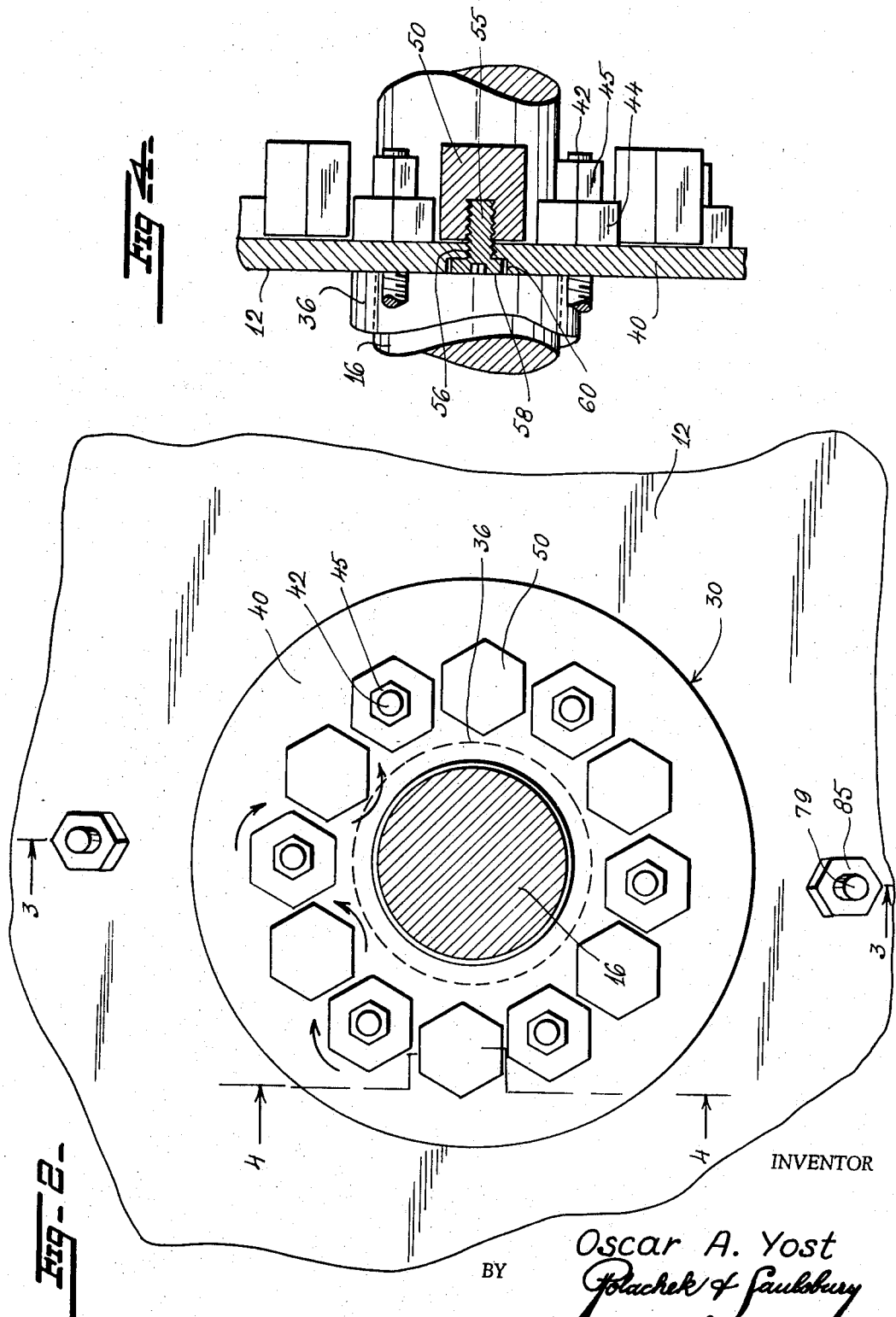
INVENTOR
Oscar A. Yost
BY Polachek & Saulsbury
ATTORNEYS

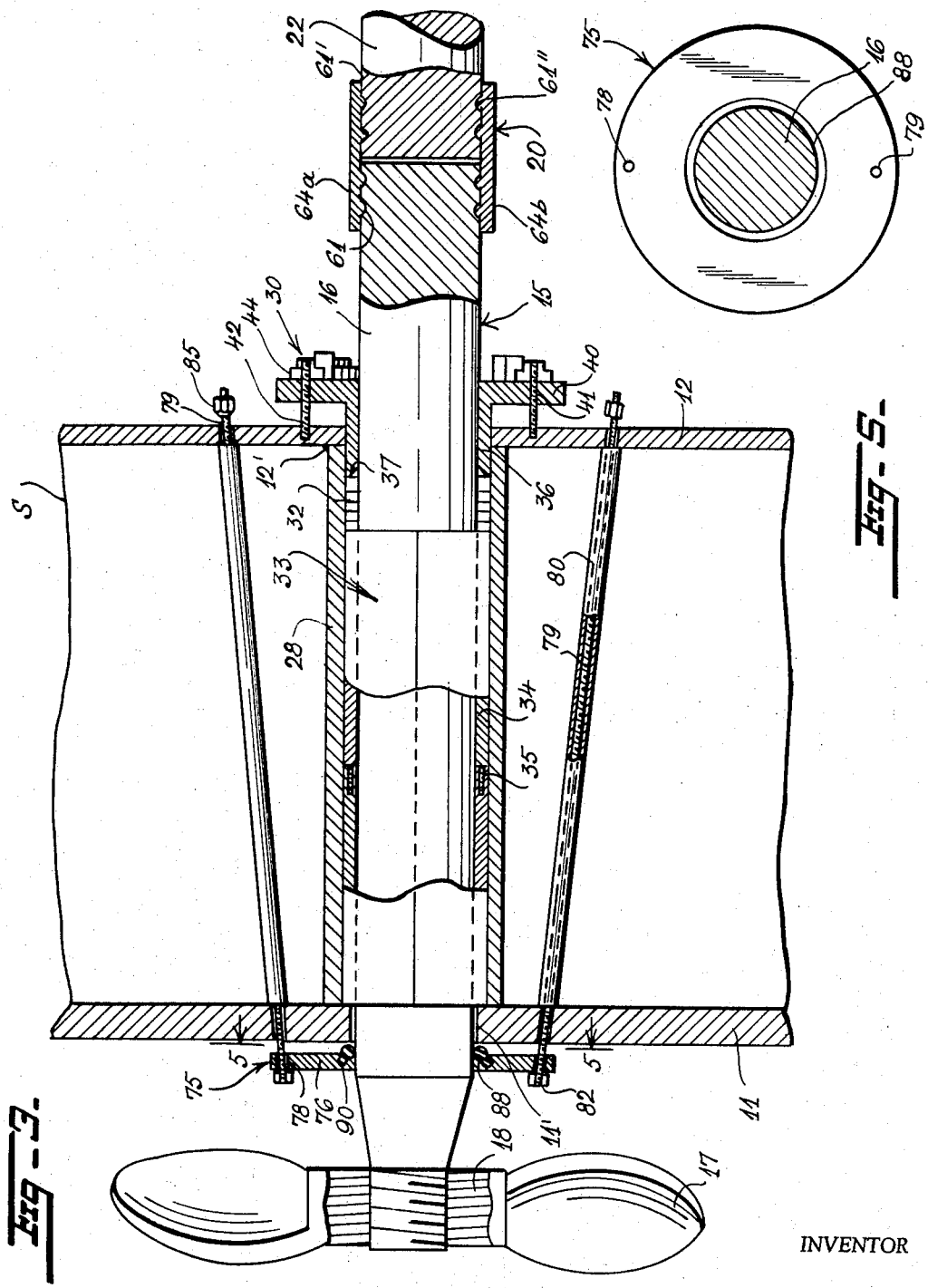

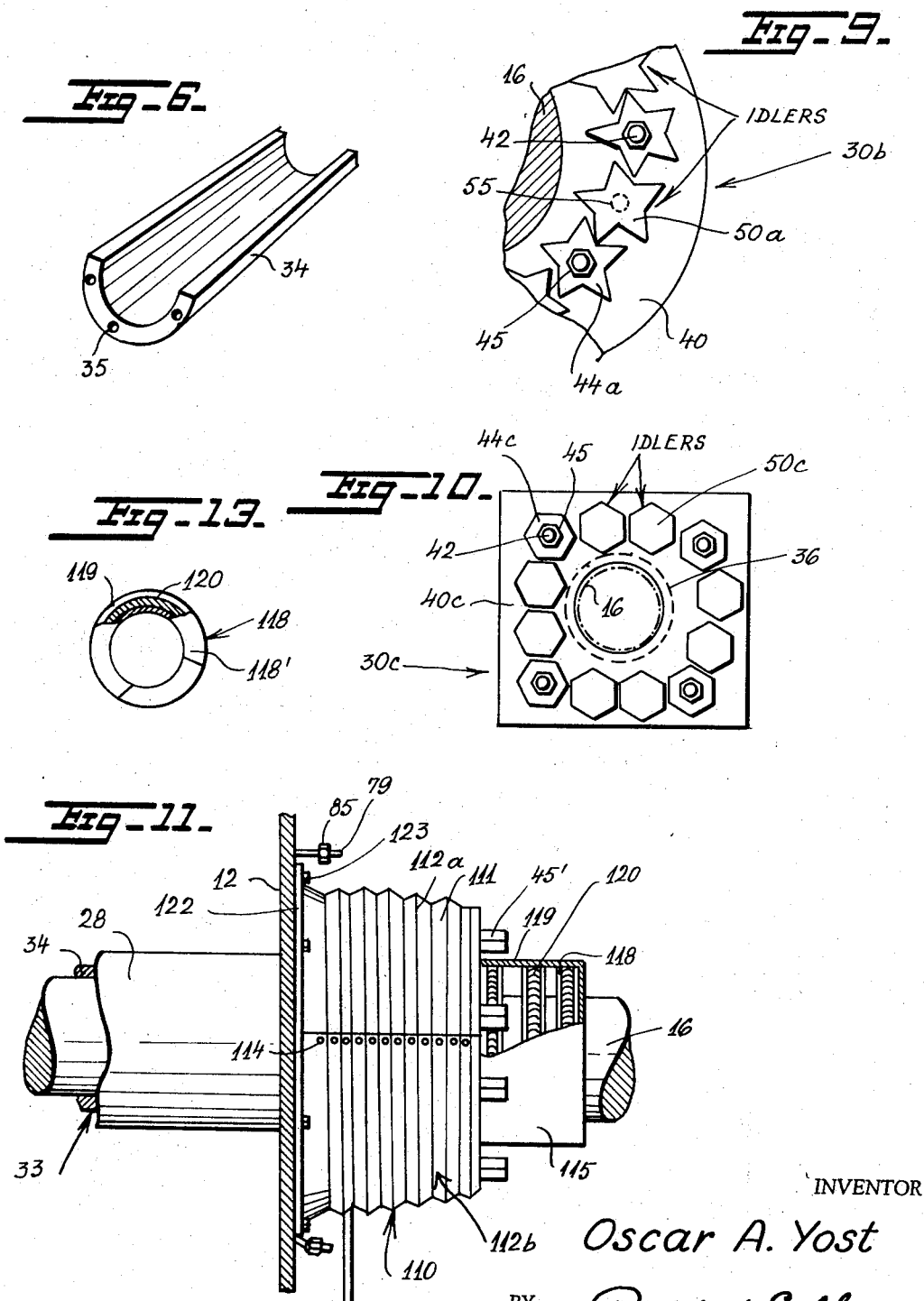

March 5, 1968 O. A. YOST 3,371,644
PROPELLER DRIVE SHAFT AND BEARING ASSEMBLY
Filed Oct. 13, 1966 5 Sheets-Sheet 5
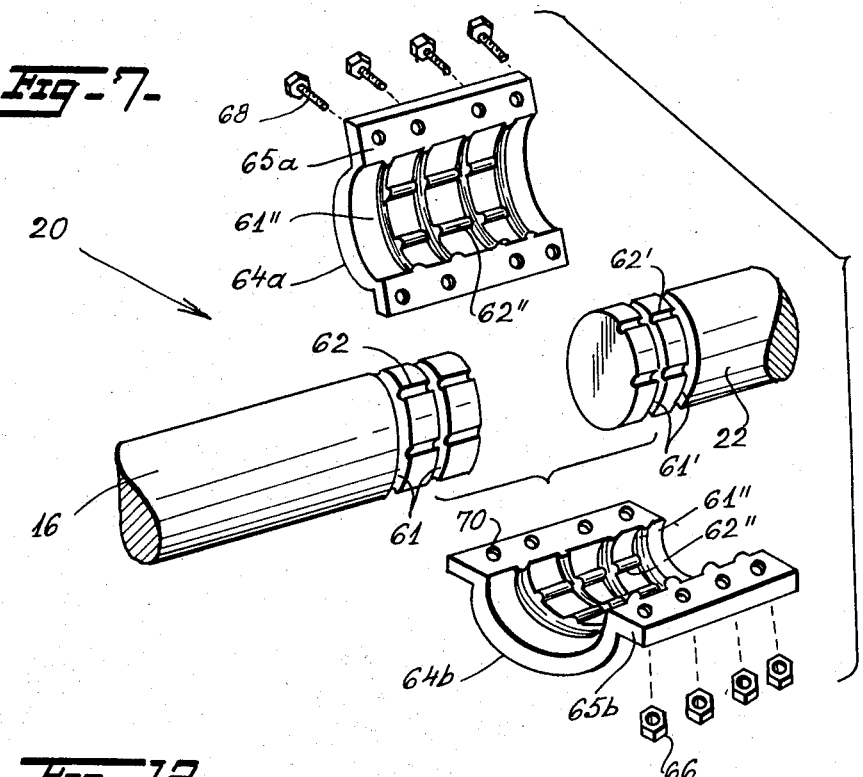
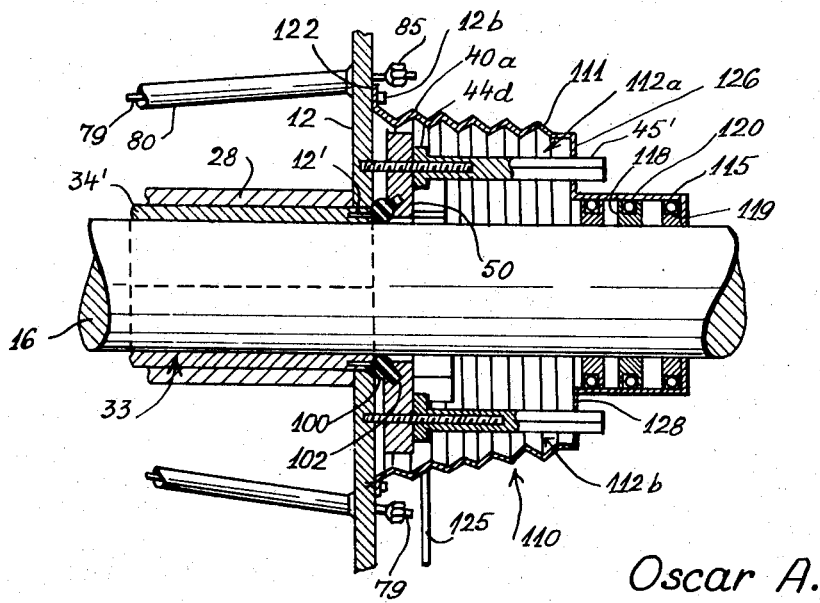
INVENTOR
Oscar A. Yost
BY Polachek & Saulsbury
ATTORNEYS

United States Patent Office 3,371,644
Patented Mar. 5, 1968

3,371,644
PROPELLER DRIVE SHAFT AND
BEARING ASSEMBLY
Oscar A. Yost, 302 W. 22nd St., New York, N.Y. 10011
Filed Oct. 13, 1966, Ser. No. 586,398
10 Claims. (Cl. 115—.5)

The invention is particularly applicable to propeller drives used in large boats such as ocean liners, freighters, steamships, and the like. Heretofore, it has been conventional to mount the tail section of a ship's propeller drive shaft in a bearing assembly located in the after tank of the ship. When the bearings of the tail section become worn and require replacement, it has been necessary to lay up the ship in drydock, because the tail section of the drive shaft had to be removed to provide access to the packing gland and bearings. Such work heretofore could only be done in a properly equipped shipyard. If the tail section of the drive shaft had to be replaced, this too had to be done in drydock. Such ship repairs have heretofore been very costly and kept the ship out of service for considerable periods of time. In addition very expensive, complex equipment and highly skilled workers were required.

The present invention is directed at overcoming this situation by making it possible to change the propeller drive shaft bearings and the tail shaft section in a ship while the ship remains afloat without requiring drydocking. According to the invention there is provided an adjustable gland employed with or without packing for the removable bearings of the tail shaft section. The gland is provided with a set of mutually engaged adjustment nuts arranged so that turning of any one nut turns all of them. Thus nuts located in the most inaccessible places are readily adjusted. The bearings are made in separate sections which can be taken off the tail section. A special coupling can be provided between the tail section and the next section of the drive shaft so that the tail section can be released and pulled through the after tank of the ship if repair or replacement of the tail section is required.

It is therefore one object of the invention to provide a novel assembly of a ship's propeller drive shaft, bearings and gland.

A further object is to provide a novel gland for bearings of a ship's propeller drive shaft.

Another object is to provide a novel coupling for the tail section of a ship's propeller drive shaft.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a side view with parts broken away of a drive shaft and bearing assembly embodying the invention.

FIG. 2 is an enlarged vertical sectional view taken on line 2—2 of FIG. 1.

FIG. 3 is a reduced vertical sectional view taken on line 3—3 of FIG. 2.

FIG. 4 is a fragmentary sectional view taken on line 4—4 of FIG. 3.

FIG. 5 is a vertical sectional view taken on line 5—5 of FIG. 3.

FIG. 6 is a perspective view of part of bearing member.

FIG. 7 is an exploded perspective view of parts of two drive shaft sections and associated coupling members.

FIG. 8 is a fragmentary sectional view similar to a part of FIG. 3, showing another form of gland.

FIG. 9 is a front view of part of another gland.

FIG. 10 is a front view of still another gland.

FIG. 11 is a side view of part of an assembly, a further gland arrangement.

FIG. 12 is a sectional view similar to FIG. 8, of the assembly of FIG. 11.

FIG. 13 is a side view with part broken away of a sealing ring used in the assembly of FIG. 12.

FIG. 14 is a side view similar to FIG. 11 of part of another assembly showing another gland arrangement.

Referring first to FIGS. 1–5, there is shown part of a ship S including hull 11 and bulkhead 12 forming parts of the after tank T of the ship. Also shown is an assembly including a propeller shaft 15 having a tail section 16 on the outer end of which is mounted a propeller 17. Tail section 16 extends through holes 11', 12' in the hull and bulkhead. The hub 18 of the propeller is engaged on the threaded outer end 19 of the tail section. The inner or forward end of section 16 is engaged by a coupling assembly 20 in axial alignment with adjacent short shaft section 22. This section has an annular flange 23 bolted to flange 24 of the next section 25, and so on. Section 25 is shown supported on pedestal bearing 21. The first forward section (not shown) terminates at the engine of the ship. A rigid steel tube 28 is horizontally disposed and connected by circumferential welds 27, 29 at opposite ends to facing sides of the hull and bulkhead. The tube 28 extends across tank T. The assembly is provided with a gland 30 which holds packing 32 in tube 28 against sleeve bearings 33.

The sleeve bearings consist of one or more pairs of semicylindrical shells 34; see FIG. 6. At the forward end of each shell is one or more threaded holes 35 in which can be engaged a threaded rod for pulling the shell out of tube 28 when the gland 30 is removed.

The gland 30 has a cylindrical body 36 which slides axially into tube 28 around the tail shaft section 16. The rear end 37 of body 36 is beveled inwardly to exert inward pressure on packing 32 to effect liquid sealing between stationary tube 28 and rotating shaft section 16. An annular flat ring 40 is integral with body 36 at its forward end. This ring has a plurality of circumferentially spaced unthreaded holes 41 through which extend axially threaded studs or bolts 42 anchored in bulkhead 12. Gear nuts 44 are shown mounted on the studs and may be hexagonal. The gear nuts have hexagonal or square lugs 45 which can be engaged by a lug wrench. Alternating with nuts 44 are idler gear nuts 50. These nuts may also be hexagonal as shown in FIG. 2. The nuts 50 are axially longer than nuts 44. The nuts 44 and 50 must be so spaced that when any one nut is turned all the nuts turn. By this gear drive effect, when any one nut is turned all the gear nuts 44 can be advanced simultaneously on studs 42 to force gland body 36 into tube 28 to compress the packing. Turning any one nut in the opposite direction retracts the nuts 44 until they come off the studs to release the gland from the tube 28.

The idler nuts 50 are mounted on bolts 55 which extend through unthreaded holes 56 in ring 40. The heads 58 of the bolts are seated in recesses 60 at the rear of the ring 40. Thus the nuts 50 turn idly while the nuts 44 are driven on or off the studs 42.

Shaft section 16 is joined by coupling assembly 20 to shaft section 22. At its forward end the tail section 16 is provided with two circumferentially extending axially spaced grooves 61 and four circumferentially spaced longitudinally extending groves 62 crossing grooves 61; see FIG. 7. The rear end of the adjacent shaft section 22 has four longitudinal grooves 62' respectively aligned with grooves 62 and crossing two circumferential axially spaced grooves 61'. Two generally semicyclindrical coupling plates 64a, 64b are provided. These plates have radial flanges 65a, 65b which are abutted and secured by nuts 66 and bolts 68 inserted through holes 70 in the flanges.

Plates 64a, 64b have internal crossed axial and circumferential ridges 62" and 61" which fit into grooves 62, 62' and 61, 61' respectively.

A rear sealing assembly 75 is provided on the drive shaft as best shown in FIGS. 1, 3 and 5. This assembly includes a flat ring 76 provided with two diametrically opposed holes 78. Long bolts 79 extend through pipes 80 mounted between the hull 11 and bulkhead 12. The rear ends of the bolts extend through holes 78 in ring 76 and terminate in heads 82. The forward ends of the bolts extend through holes 83 in the bulkhead. Nuts 85 at the forward ends of the bolts can be tightened or loosened. In ring 76 at its forward side is a resilient artificial rubber ring gasket 88. This gasket is set in a groove 90 in the ring. Normally the ring is loose on the shaft section 16 which extends through the ring. When the nuts 85 are tightened, the gasket 88 seals the opening 11' in the hull 11 outside the ship.

If it becomes necessary to replace the sleeve bearings, a wrench will be engaged on any lug 45 a nut 44. When this nut 44 is turned all the nuts 44 and 50 will turn. Thus the nuts 44 can be removed from studs 42. The gland body 36 and ring 40 can then be pulled back to release the packing. The packing is preferably a spirally wound member which can easily be pulled out of tube 28. Then a threaded rod will be engaged in the exposed threaded holes 35 of the forward bearing members or plates 34 and these plates can be pulled forwardly out of the tube 28. The rear bearing plates can be pulled out in the same way. If necessary, coupling plates 64a, 64b can be removed if the forward end of shaft section 16 beyond bulkhead 12 is too short to permit retraction of the gland.

Before the gland and bearings are removed, it will be desirable to tighten nuts 85 so that resilient gasket 88 will seal the tail shaft section at the hull to prevent entry of water into the ship through tube 28.

If it becomes necessary to replace tail shaft section 16, this can be done without drydocking the ship. Ballast will be shifted from after tank T to forward tanks (not shown). Also cargo will be shifted forward so that the ship rises at the rear end. This is done to lift the rear end of the tail section out of the water. The propeller will be removed by means of a crane. Coupling 20 will then be detached. Also the bolts will be removed from attached flanges 23, 24 of sections 22, 25. Now released section 22 can be lifted out of the way by a crane. Then the gland 30 will be removed, followed by packing 32 and bearings 33. The shaft section 16 can now be pulled forward through tube. If desired the lower bearing plates 34 can be left in place until the shaft section 16 is removed. Replacement of the tail shaft section will be done in similar manner by inserting it through the tube 28. Thus the replacement of the tail section does not require laying up the ship in drydock.

FIG. 8 shows another shaft and bearing assembly which is similar to that already explained in connection with FIGS. 1–7. In this assembly the packing 32 previously used is omitted. Gland 30a employs the same gear nuts 44 and 50 as gland 30. Body 36 is removed from the gland and instead a ring gasket 100 is inserted in groove 102 of annular ring 40a. The gasket serves to seal the shaft section 16 at opening 12' of bulkhead 12. The bearing plates 34' of bearings 33' extend up to forward side of the bulkhead where they can be contacted by the ring gasket.

FIG. 9 shows another gland arrangement. The gear nuts 44a and 50a of gland 30b are star shaped instead of hexagonal. They operate in the same manner as explained for gland 30, in which turning one nut results in turning all the others.

FIG. 10 shows another gland 30c in which ring 40c is rectangular in form. Four gear nuts 44c are provided near corners of the ring engaged on studs 42. Idler gear nuts 50c are located in pairs between each pair of nuts 44c. Cylindrical body 36a through which shaft section 16 passes, extends from the center of the ring 40c. Gland 30c operates like the other glands described, in which turning one gear nut results in turning all the other. All the gear nuts 44c turn in the same direction.

In FIGS. 11–13 is shown another assembly in which parts corresponding to those of FIG. 8 are identically numbered. The gland structure is further provided with a rather conical boot 110. The walls 111 of the boot are angled so that the boot is variable in axial length. The boot is made from two semiconical shells 112a and 112b overlapped at their edges and secured by bolts 114. The forward cylindrical end 115 of the boot is sealed to the rotating tail shaft section 16 by ring 118 formed of arcuate segments 118'. The rings have outer grooves 119 in which are engaged garter spring 120. The rear end of the boot is formed with radial flanges 122 secured by bolts 123 to the bulkhead 124. This boot serves to retain hold sea water which may leak past the bearings 33. A drain pipe 125 may be connected to the boot for draining it. A bilge pump (not shown) will be connected to the boot. The lugs 45' of the gear nuts 44d are extended through holes 126 in annular wall 128 of the boot. Thus the gear nuts can be turned from outside the boot. Turning of one gear nut will result in turning all of them.

The assembly shown in FIG. 14 is similar to that of FIG. 11 except that the boot 110' has corrugated rather than angular walls. The cylindrical end 115' of this boot is formed with internal circumferential grooves 130 in which are engaged rubber rings 120'. These rings seal the boot to the rotating shaft 16. The flanged rear end 122' of the boot is secured to bulkhead 12 by bolts 123'.

In all forms of the invention described, there are provided glands with gear nuts any one of which can be turned for turning all the others to advance the gland rearwardly or to loosen the gland so that it can be easily removed.

While I have illustrated and described the preferred embodiments of my invention it is to be understood that I do not limit myself to the precise construction herein disclosed and that various changes and modifications may be made within the scope of the invention as defined in the appended claims.

What is claimed is:

1. A propeller drive assembly for a ship having a hull, a bulkhead spaced from said hull and defining a tank therewith, and a rigid axially horizontal tube extending in a fore and aft direction and secured at opposite ends to said hull and bulkhead with openings in the hull and bulkhead respectively registering with opposite ends of the tube; said assembly comprising a cylindrical drive shaft section rotatably disposed in said tube and extending its rear end through the hull to support a propeller and extending at its forward end through the bulkhead for driving connection to an engine, a plurality of semicylindrical bearing plates disposed in said tube between the drive shaft selection and said tube, said bearing plates being removable through a forward end of the tube and the opening in the bulkhead, and a gland assembly at the bulkhead adjustably secured thereto for sealing the shaft at said forward end of the tube, said gland assembly comprising a flat ring having circumferentially spaced holes, a plurality of studs mounted in said bulkhead and extending through said holes in the ring, first gear nuts mounted on the studs, and idler gear nuts rotatably supported by the ring and alternating with first named gear nuts, whereby turning any one gear nut rotates all gear nuts for advancing the ring axially to seal the shaft section to the opening in the bulkhead and for retracting the ring to release the sealing of the shaft section to the opening in the bulkhead.

2. A propeller drive assembly as recited in claim 1, further comprising a packing around the shaft at a forward end of one pair of bearing plates, said gland assembly further comprising a cylindrical body axially aligned with the bearing plates, surrounding the shaft section and insertable into the tube to compress the packing and seal the rotating shaft section to the tube.

3. A propeller drive assembly as recited in claim 1, further comprising another ring encircling said shaft section outside the hull, a pair of long bolts engaged at one end with the other ring and supporting the ring, said bolts extending forwardly through said tank and bulkhead, other nuts on said long bolts for drawing said other ring to the hull, and a resilient ring gasket supported by said other ring and encircling the shaft section for sealing the shaft section to the hull when the nuts on the long bolts are tightened.

4. A propeller drive assembly as recited in claim 1, wherein certain of the gear nuts have lugs engageable by a lug wrench, whereby turning of any one lug results in turning of all nuts.

5. A propeller drive assembly as recited in claim 1, wherein said shaft section has circumferential and axially extending grooves in its forward end, another drive shaft section axially aligned with the first named shaft section and having other circumferentially and axially extending grooves in its rear end adjacent to the first shaft section, and a pair of semicylindrical coupling plates having internal ridges engaged in the grooves of the two shaft sections, said coupling plates having abutted flanges detachably secured together by fastener members so that the two shaft sections rotate together.

6. A propeller drive assembly as recited in claim 1, further comprising a bellows-like boot encircling the shaft outside the bulkhead and enclosing the gland to retain any water leaking past the bearing plates in the tube.

7. A propeller drive assembly as recited in claim 1, further comprising a resilient ring carried by said flat ring of the gland assembly, said resilient ring surrounding said shaft section and facing the bulkhead to seal the shaft to the opening of the bulkhead when the flat ring is urged toward the bulkhead by the first gear nuts.

8. A propeller drive assembly as recited in claim 7, further comprising a bellows-like boot encircling the shaft outside the bulkhead and enclosing the gland to retain any water leaking past the bearing plates in the tube.

9. A propeller drive assembly as recited in claim 7, further comprising another ring encircling said shaft section outside the hull, a pair of long bolts engaged at one end with the other ring and supporting the ring, said bolts extending forwardly through said tank and bulkhead, other nuts on said long bolts for drawing said other ring to the hull, and a resilient ring gasket supported by said other ring and encircling the shaft section for sealing the shaft section to the hull when the nuts on the long bolts are tightened.

10. A propeller drive assembly as recited in claim 1, wherein the gear nuts have angled flat faces meshing with each other so that ear gear nut turns an adjacent gear nut.

References Cited
UNITED STATES PATENTS

| | | | |
|---|---|---|---|
| 691,813 | 1/1902 | Saxton | 277—108 |
| 2,555,932 | 6/1951 | Reed | 308—36.2 |
| 3,177,841 | 4/1965 | Galuska | 115—34 |

ANDREW H. FARRELL, *Primary Examiner.*